United States Patent
Gadamsetty et al.

(10) Patent No.: US 7,315,521 B2
(45) Date of Patent: Jan. 1, 2008

(54) MOBILE COMPUTING DEVICE TO PROVIDE VIRTUAL OFFICE USAGE MODEL

(75) Inventors: Uma M. Gadamsetty, Chandler, AZ (US); Kristoffer D. Fleming, Chandler, AZ (US); Hani Elgebaly, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 560 days.

(21) Appl. No.: 10/881,114

(22) Filed: Jun. 29, 2004

(65) Prior Publication Data

US 2005/0286453 A1 Dec. 29, 2005

(51) Int. Cl.
*H04Q 7/24* (2006.01)
(52) U.S. Cl. .................. 370/311; 370/352; 455/574
(58) Field of Classification Search ............... None
See application file for complete search history.

(56) References Cited

U.S. PATENT DOCUMENTS

2002/0071424 A1* 6/2002 Chiu et al. .............. 370/352
2003/0162544 A1* 8/2003 Austin et al. ............ 455/445
2004/0063454 A1* 4/2004 Sasaki .................... 455/522
2004/0081120 A1* 4/2004 Chaskar .................. 370/328
2005/0053054 A1    3/2005 Das et al.

OTHER PUBLICATIONS

U.S. Appl. No. 10/685,111, filed Oct. 14, 2003, Elgebaly et al.
U.S. Appl. No. 10/974,175, filed Oct. 27, 2004, Elgebaly et al.
U.S. Appl. No. 11/173,841, filed Jun. 30, 2005, Gadamsetty et al.
U.S. Appl. No. 10/977,967, filed Oct. 28, 2004, Bakre et al.
U.S. Appl. No. 10/367,076, filed Feb. 14, 2003, Kardach et al.
U.S. Appl. No. 09/595,238, filed Jun. 16, 2000, Rajagopal et al.
U.S. Appl. No. 09/752,643, filed Dec. 29, 2000, Fleming et al.
U.S. Appl. No. 10/811,115, filed Mar. 29, 2004, Ginzburg et al.

* cited by examiner

*Primary Examiner*—Erika A. Gary
(74) *Attorney, Agent, or Firm*—Blakely, Sokoloff, Taylor & Zafman LLP

(57) ABSTRACT

In one embodiment, a mobile computing device that includes an interface to communicate VOIP calls in a non-main CPU/OS state. In one embodiment, the mobile computing device includes a secondary display located on an external area of the mobile computing device, to display information related to a VOIP call. In one embodiment, the mobile computing device further includes an interface to communicate the VOIP call wirelessly with a headset.

23 Claims, 5 Drawing Sheets

MOBILE COMPUTING DEVICE TO PROVIDE VIRTUAL OFFICE USAGE MODEL

FIELD OF INVENTION

Embodiments of the present invention relate generally to the field of mobile data communications. More particularly, embodiments of the present invention relate to communication capabilities of a mobile computing device when in a reduced power mode.

BACKGROUND

As electronic and computer technology continues to evolve, communication of information to a user at all times becomes increasingly important. For example, now more than ever users of personal digital assistants (PDAs) are continuously checking email, looking-up contacts, drafting documents on-the-go, and scheduling. Other users are utilizing mobile phones with built-in PDAs. In addition to these new devices, more and more users are using tablet mobile computing devices. The mobility of the powerful computing devices makes them ideal for the business traveler.

Wireless networks that provide for mobile communications connectivity to the mobile devices are therefore also increasing. Many airports and other public places already have wireless networks, such as Wi-Fi, that can connect mobile devices (such as mobile PCs) to the Internet.

When in transit, and not connected to a power outlet, mobile PCs are powered by batteries that need to be periodically recharged. Without recharging, the batteries used by mobile computing devices can generally provide 2-4 hours of "on" time. Thus, when in transit, mobile PCs are generally turned off to conserve power, as well as for other reasons. When turned off, they cannot receive data from wireless networks.

DETAILED DESCRIPTION

In one embodiment, a mobile computing device that includes an interface to communicate VOIP calls in a non-main CPU/OS state is described. In one embodiment, the mobile computing device includes a secondary display located on an external area of the mobile computing device, to display information related to a VOIP call. In one embodiment, the mobile computing device further includes an interface to communicate the VOIP call wirelessly with a headset.

In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In one embodiment, the mobile computing device further includes multiple power states, which are described in more detail below. The power states include a non-main CPU/OS state and Low Power Main CPU/OS based state (also these states are referenced herein as extended access mode (EMA)), wherein a main Central Processing Unit (CPU) and Operating System (OS) are either not in operation or in low power operation. As a result, the mobile computing device consumes less power.

Figure 1:
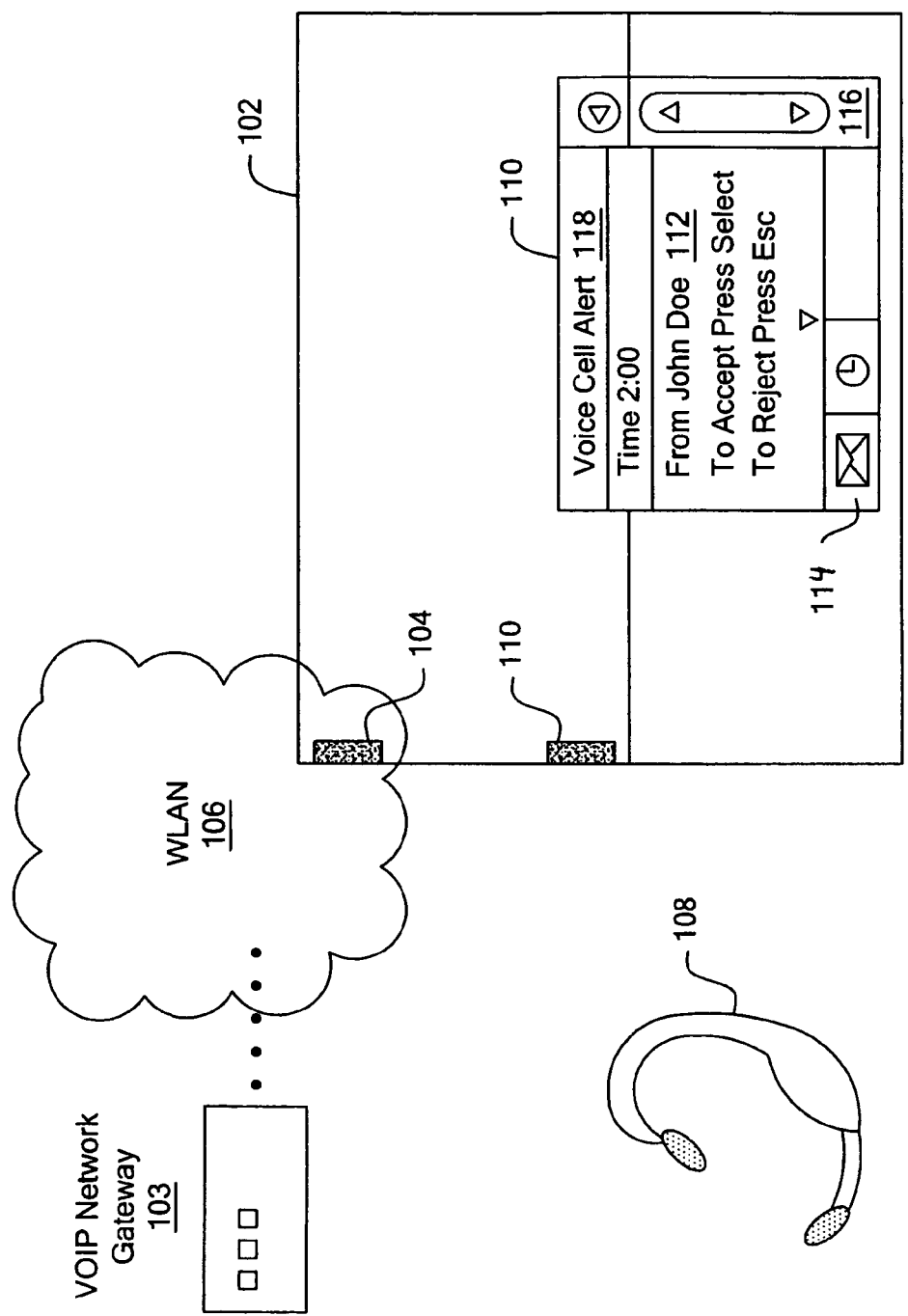
FIG. 1 presents a diagram of a mobile computing device, in accordance with one embodiment.

In one embodiment, as illustrated in FIG. 1, the mobile computing device 102 includes a first interface 104 to exchange/communicate data with a network (e.g., Wireless Local Area Network (WLAN)) 106 via a wireless connection. In one embodiment, the first interface is to exchange/communicate data for a telephone call, such as a voice over Internet protocol (VOIP) call, sometimes also referred to as an IP telephony call. The WLAN is in communication with a network gateway 103, such as a VoIP network gateway, to provide access to a public telephone exchange.

As described herein, a VOIP call includes a two-way transmission of audio over a packet-switch IP network (TCP/IP network). In one embodiment, VOIP call uses two protocols; one for transport and another for signaling. Transport is provided by UDP over IP for voice packets, and either UDP or TCP for IP signals. Alternative protocols may be used.

In one embodiment, the mobile computing device 102 includes a voice soft phone client application to support communicating of the VOIP calls. Furthermore, when in a non-main CPU/OS state, the mobile computing device 102 remains operable to exchange data with the WLAN 106, and to process VOIP calls.

In one embodiment, the mobile computing device further includes a second interface 105 to communicate the VOIP calls with a local headset 108. In one embodiment, the mobile computing device 102 and the headset communicate 108 via a short-range wireless standard. One such short-range wireless standard is commonly referenced as "Bluetooth™." Bluetooth™, which is only one example of a short-range wireless standard, is actually a combination of specialized computer chips and software. Bluetooth™ is the name for a technology specification for small form factor, low-cost, short-range radio links between mobile PDAs, mobile computing devices, mobile phones and other portable devices. Details of the standard are published by the Bluetooth™_SIG Inc (see www.bluetooth.com) and standardized by the IEEE as 802.15.. One of the present Bluetooth™ specification restrictions is to limit the transmission range so that the resulting radiation pattern typically does not exceed 10 meters. Additional short-range wireless standards include the IEEE 802.11 RF wireless standards: 802.11 HR, 802.11b, and 802.11@5 GHz standards. Other exemplary short-range wireless standards that may be used include: HiperLan, HiperLan II, HomeRF, SWAP, OpenAir, and other wireless protocols.

The mobile computing device includes a primary display on interior side of a lid of the mobile computing device, which faces the keyboard when the lid of the mobile computing device is closed. In one embodiment, the mobile computing device further includes a secondary display 110 located on an external surface of the mobile computing device (also referenced herein as a quick peek liquid crystal display (LCD.)) In one embodiment, the secondary display 110 is located on a back side of the lid of the mobile computing device.

The secondary display is operable when the mobile computing device is in the non-main CPU/OS state (with the lid of the mobile computing device usually closed.) The secondary display provides text messages 112 and/or graphical images 114 related to a VOIP call processed by the mobile computing device. In one embodiment, additional manual controls/buttons 116 are also provided to interface with the secondary display 110 in processing a VOIP call. For example, in one embodiment, the secondary display and associated controls provide voice call management such as displaying incoming calls, caller IDs, selecting or rejecting incoming calls, playing and storing voice messages, replying to voice messages etc.

When a VOIP call is received via the first interface 104, the mobile computing device 102 provides a notification. In one embodiment, an audible alert is generated in either the headset or by the mobile computing device to indicate an incoming call. In one embodiment, a notification may be provided via the secondary screen on the mobile computing device. For example, the secondary screen may provide a text message 118 or graphical images to indicate that an incoming call is present, and may further provide a user ID of the incoming call.

A user may answer, reject, and/or terminate a call via the manual control/buttons on the mobile computing device, or using a control/button on the headset. Alternatively, a user can issue speech commands on the headset to process the call. The speech commands are interpreted by the mobile computing device, which in turn will make appropriate selections based on the speech commands.

Figure 2:
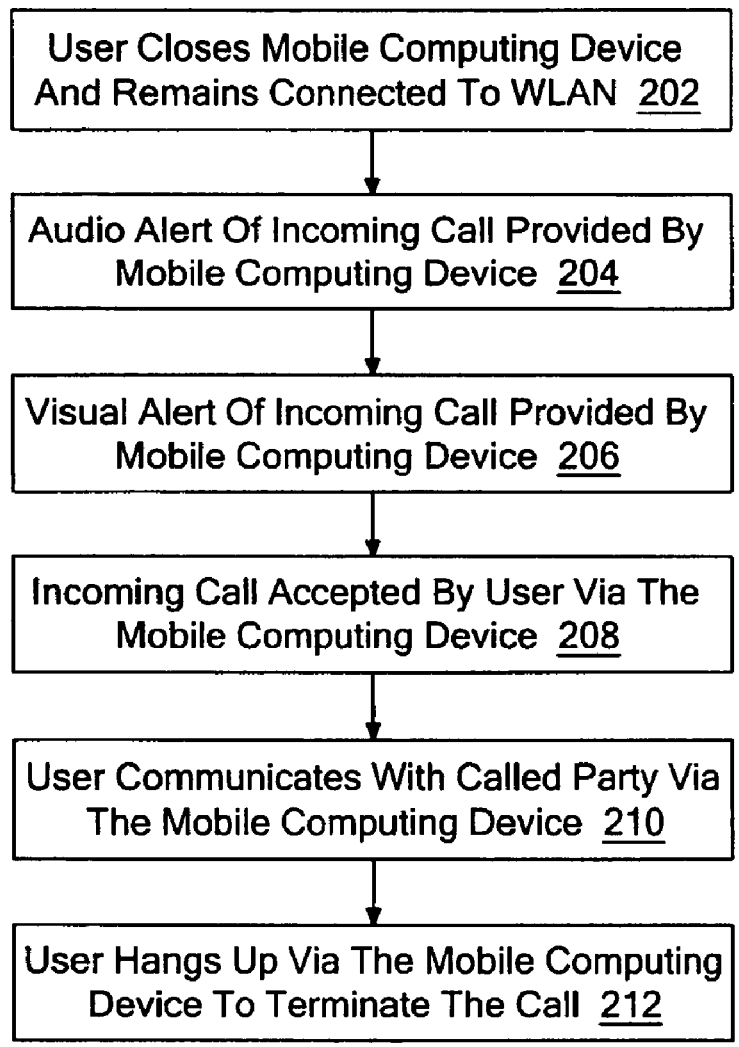
FIG. 2 presents a flow diagram describing the processes of receiving and processing a VOIP call via the mobile computing device, in accordance with a one embodiment.

FIG. 2 provides a flow diagram describing the processes of receiving and communicating a VOIP call via the mobile computing device, in accordance with one embodiment. Assume a user is in a rush to attend a meeting in far away room from their current location. The user closes their mobile computing device and wears the wireless headset.

In process 202, when the user closes the mobile computing device, the system transitions into the non-main CPU/OS state, but remains connected to the WLAN via the first interface. In process 204, an incoming call is received, and the user is notified via an audible alert in the headset. In process 206, the user views the secondary display on the top of closed mobile computing device, and views a prompt for an incoming voice call.

In process 208, the user accepts the voice call by selecting a button which is adjacent to the secondary display or using a headset button. In an alternative embodiment, the user can accept the call or reject the call by issuing a speech command on the headset.

In process 210, the user communicates with the caller using the headset, while the mobile computing device remains in the non-main CPU/OS state. In process 212, the user presses a hang up button either on the headset or a button adjacent to the secondary display.

Figure 3:
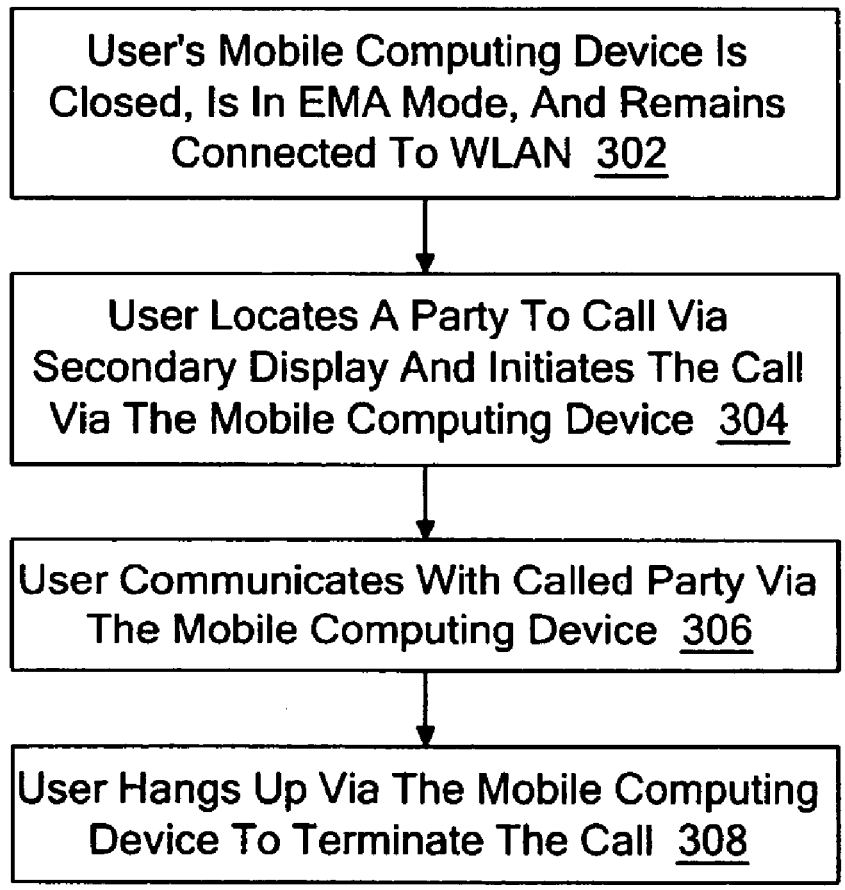
FIG. 3 presents a flow diagram describing an additional example of using the mobile computing device, in accordance with one embodiment.

FIG. 3 provides a flow diagram describing an additional example of using the mobile computing device in accordance with one embodiment. In process 302, the user is wearing their headset and sitting in a room waiting for someone to join them. The user's mobile computing device is closed and is in EMA mode to save power.

The user wants to call their expected guest to learn whether the person is going to come on time. In process 304, using the quick peek LCD display and buttons adjacent to it, the user goes through a contact list and initiates a call to the person. Alternatively, the user can make the voice call by issuing speech commands on the headset. The mobile computing device and dials out the person's number to make the connection.

In process 306, the user conducts their conversation with the called party using the head set without opening the mobile computing device. In process 308, the user hangs up either using buttons on the headset or on the mobile computing device, or by issuing speech commands.

Figure 4:
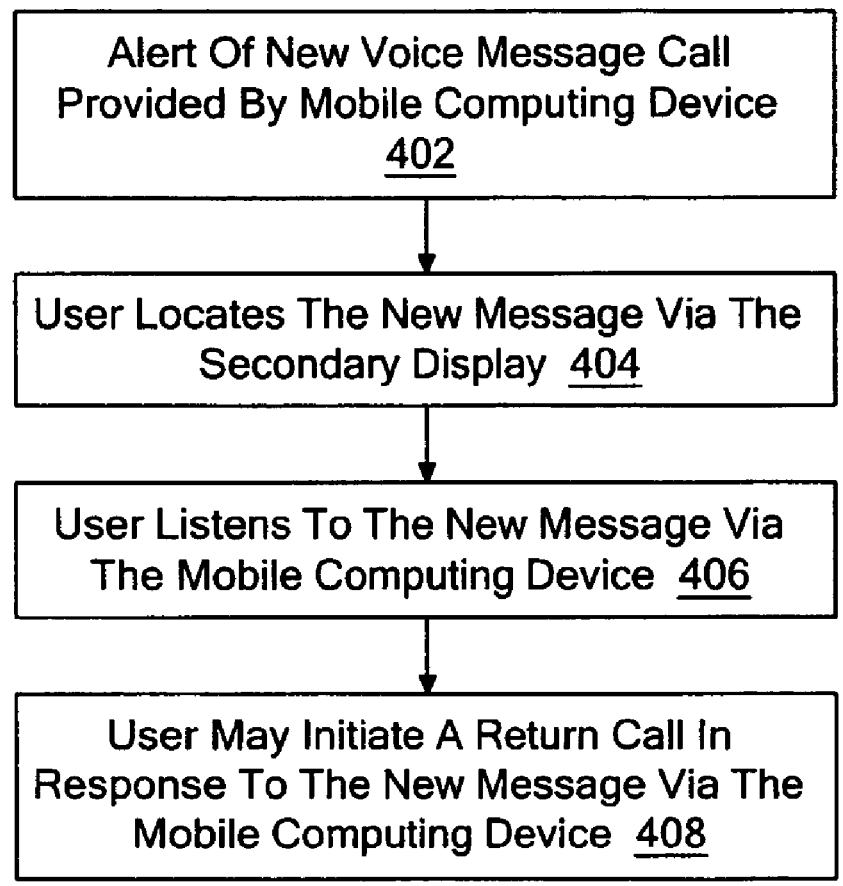
FIG. 4 presents an additional flow diagram describing yet another example of using the mobile computing device, in accordance with one embodiment.

FIG. 4 provides an additional flow diagram describing yet another example of using the mobile computing device in accordance with one embodiment. The user is again sitting in a room waiting for someone to join them, and the user's mobile computing device is closed and in EMA mode to save power. In process 402, the user notices a voice mail message 114 indication on the quick peek LCD.

In process 404, using the quick peek LCD display and adjacent buttons, the user goes through a message list and selects the new voicemail message. In process 406, the user listens to the message using the head set, while the mobile computing device remains closed and in the EMA mode. After the user listens to the message, in process 408 the user may return the call by choosing a reply selection on the message either by speech or button commands.

Figure 5:
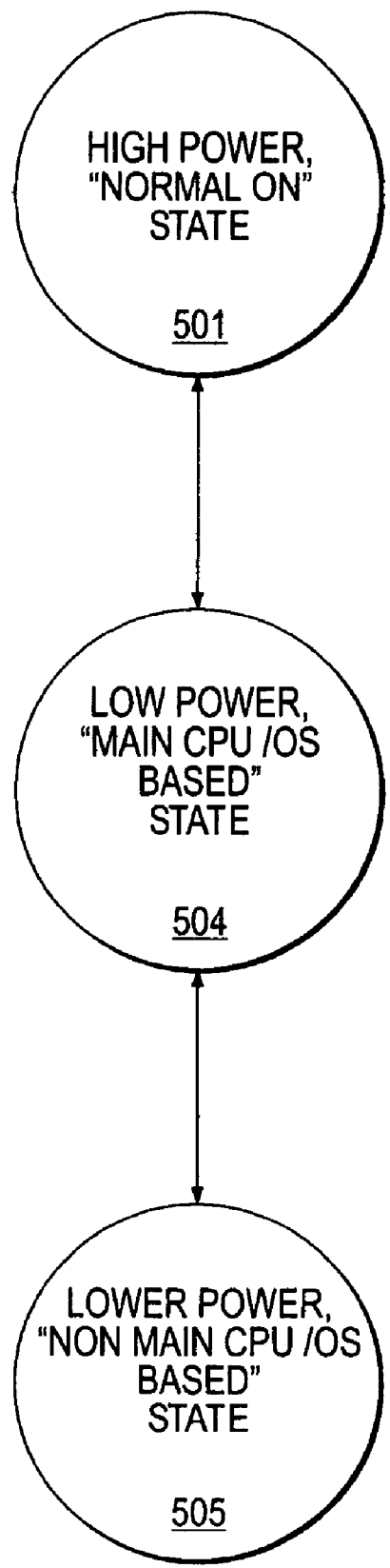
FIG. 5 illustrates a state diagram for a mobile computing device having multiple power operating states, in accordance with one embodiment.

As previously stated, in one embodiment, the mobile computing device includes multiple power states, in accordance with one embodiment. FIG. 5 illustrates a state diagram of the multiple power states, in accordance with one embodiment. According to the state diagram observed in FIG. 5, a computing system has three states: 1) a high power, "normal on" state 501; 2) a "main CPU/OS based low power" state 504; and, 3) a "non main CPU/OS based low power" state 505. The different power states may be selected by a user of the mobile computing device, or automatically entered in response to a power source (e.g., receiving power from an outlet vs. a battery source), or an amount of power remaining within a battery.

In one embodiment of the "normal on" state 501, the mobile computing device has all of its primary architectural components powered on. During the "main CPU/OS based low power" state 504, the main CPU 401 is powered on and can execute software; yet, primary architectural components such as a graphics controller, primary display, and various I/O units may be powered down so that power consumption is reduced. Moreover, the main CPU itself, although functional, may be configured so as to have reduced performance and reduced power consumption as compared to the normal on state 501. In an embodiment, this is achieved by lowering the frequency of the main CPU's clock speed as compared to the "normal on" state 501. As a consequence, the main CPU has reduced processing speed, but, consumes less power. In one embodiment, during the "main CPU/OS based low power" state 504, the first wireless interface 104 and the second wireless interface 110 remain powered on, so that the mobile computing device may continue to process VOIP calls.

In one embodiment, during the "non main CPU/OS based lower power" state 505, the main CPU 401 is powered down so that it cannot execute software based upon the computing system's main OS. In one embodiment, during the "main CPU/OS based low power" state 504, the first wireless interface 104 and the second wireless interface 110 remain powered on, so that the mobile computing device may continue to process VOIP calls.

In alternative embodiments, the quantity of powers states may vary, and/or the units within a mobile computing device that are powered down or remain powered on, in the respective powers states, may vary as well.

The processes described above can be stored in a memory of a computer, system, or machine as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

The invention claimed is:

1. A mobile computing device comprising;
   a central processing unit (CPU);
   a first interface to communicate, via a wireless connection, a voice over Internet Protocol (VoIP) telephone call when the CPU is in a non CPU/operating system (OS) power mode that disables the CPU from executing software based on the OS; and
   a second interface to communicate the VoIP call with a user of the mobile computing device.

2. The mobile computing device of claim 1 wherein the second interface is to provide a wireless connection to a headset.

3. The mobile computing device of claim 2 wherein the wireless connection is via a Bluetooth™ connection.

4. The mobile computing device of claim 1, further comprising a screen on an exterior surface of the mobile computing device to display information of a VoIP call.

5. The mobile computing device of claim 2, further comprising controls on the headset to process the VoIP call.

6. The mobile computing device of claim 4, further comprising controls on an exterior surface of the mobile computing device to process the VoIP call.

7. The mobile computing device of claim 1 wherein the mobile computing device is to communicate the VoIP call, including at least one of to receive the VoIP call, to initiate VoIP call, to store a message of the VoIP call, and to play a message of the VoIP call.

8. A method comprising:
   receiving a wireless Internet Protocol telephony call at a mobile computing device in a non central processing unit (CPU)/non operating system (OS) power mode that disables the CPU from executing software based on the OS; and
   communicating with a second device while the mobile computing device remains in the non CPU/(OS) power mode.

9. The method of claim 8, further comprising an interface providing a wireless connection to a headset.

10. The method of claim 9, wherein the wireless connection is via a Bluetooth™ connection.

11. The method of claim 9, further comprising receiving controls signals from headset to process the Internet Protocol telephony call.

12. The method of claim 8, further comprising displaying on a screen of an exterior surface of the mobile computing device, information of the Internet Protocol telephony call.

13. The method of claim 12, further comprising receiving control signals from controls on an exterior surface of the mobile computing device to process the Internet Protocol telephony call.

14. A mobile computing device comprising:
   a central processing unit (CPU);
   an operating system (OS) to operate on the CPU; and
   a soft phone client application to wirelessly receive and send an Internet Protocol telephony call, when the CPU is in a non CPU/OS power mode that disables the CPU from executing software based on the OS.

15. The mobile computing device of claim 14, further comprising a unit to wirelessly communicate the call to a headset.

16. The mobile computing device of claim 14, further comprising a primary display located on an inside of a lid of the mobile computing device, and a secondary display, located on an exterior of the lid, the secondary display to display information related to the Internet Protocol telephony call.

17. The mobile computing device of claim 14, wherein the mobile computing device is to receive control signals via at least one of a headset and controls on an exterior of the mobile computing device.

18. A machine readable medium encoded with instructions capable of being executed by a computer, which when executed, perform a method comprising:
   receiving a wireless Internet Protocol telephony call at a mobile computing device in a non central processing unit (CPU)/non operating system (OS) power mode that disables the CPU from executing software based on the OS; and
   communicating with a second device while the mobile computing device remains in the non CPU/(OS) power mode.

19. The machine readable medium of claim 18, further comprising an interface providing a wireless connection to a headset.

20. The machine readable medium of claim 19, wherein the wireless connection is via a Bluetooth™ connection.

21. The machine readable medium of claim 19, further comprising receiving controls signals from the headset to process the Internet Protocol telephony call.

22. The machine readable medium of claim 19, further comprising receiving control signals from controls on an exterior surface of the mobile computing device to process the Internet Protocol telephony call.

23. The machine readable medium of claim 18, further comprising displaying on a screen of an exterior surface of the mobile computing device, information of the VoIP call.

* * * * *